United States Patent
Cheng

(10) Patent No.: US 11,528,685 B2
(45) Date of Patent: Dec. 13, 2022

(54) UPLINK CONTROL INFORMATION TRANSMISSION METHOD AND RELATED APPARATUS

(71) Applicant: HUAWEI TECHNOLOGIES CO., LTD., Guangdong (CN)

(72) Inventor: Yan Cheng, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/265,239

(22) Filed: Feb. 1, 2019

(65) Prior Publication Data

US 2019/0166595 A1    May 30, 2019

Related U.S. Application Data

(63) Continuation of application No. PCT/CN2017/095180, filed on Jul. 31, 2017.

(30) Foreign Application Priority Data

Aug. 10, 2016  (CN) .......................... 201610657711.5

(51) Int. Cl.
   *H04W 72/04*    (2009.01)
   *H04L 5/00*     (2006.01)
   (Continued)

(52) U.S. Cl.
   CPC ....... *H04W 72/0406* (2013.01); *H04L 1/1812* (2013.01); *H04L 5/0055* (2013.01);
   (Continued)

(58) Field of Classification Search
   CPC ............. H04W 72/0406; H04W 72/04; H04W 72/1289; H04W 72/044; H04W 72/1263;
   (Continued)

(56) References Cited

U.S. PATENT DOCUMENTS

| | | | |
|---|---|---|---|
| 2011/0038277 A1* | 2/2011 | Hu ........................ | H04L 1/0027 370/252 |
| 2011/0310823 A1* | 12/2011 | Nam ..................... | H04L 1/0073 370/329 |

(Continued)

FOREIGN PATENT DOCUMENTS

| | | |
|---|---|---|
| CN | 101540631 A | 9/2009 |
| CN | 102647248 A | 8/2012 |

(Continued)

OTHER PUBLICATIONS

PCT International Search Report issued in International Application No. PCT/CN2017/095180 dated Oct. 19, 2017, 22 pages (with English translation).

(Continued)

*Primary Examiner* — Tejis Daya
(74) *Attorney, Agent, or Firm* — Fish & Richardson P.C.

(57) ABSTRACT

This application discloses example methods and apparatuses for information transmission. One example method includes receiving, by a terminal device, downlink control information that includes first information used to indicate a symbol that carries uplink control information. The terminal device can then determine, based on the first information, the symbol that carries the uplink control information, and can map the uplink control information to the symbol that carries the uplink control information. The terminal device then sends the uplink control information to a network device.

8 Claims, 6 Drawing Sheets

```
                                                     ┌─ 301
┌─────────────────────────────────────────────────┐
│ A terminal device receives downlink control     │
│ information, where the downlink control         │
│ information includes first information, and     │
│ the first information is used to indicate a     │
│ symbol that carries uplink control information  │
└─────────────────────────────────────────────────┘
                       │
                       ▼                             ┌─ 302
┌─────────────────────────────────────────────────┐
│ The terminal device determines, based on the    │
│ first information, the symbol that carries the  │
│ uplink control information                      │
└─────────────────────────────────────────────────┘
                       │
                       ▼                             ┌─ 303
┌─────────────────────────────────────────────────┐
│ The terminal device maps the uplink control     │
│ information to the symbol that carries the      │
│ uplink control information, and sends the       │
│ uplink control information to a network device  │
└─────────────────────────────────────────────────┘
```

(51) Int. Cl.
*H04L 1/18* (2006.01)
*H04L 5/14* (2006.01)
*H04W 72/12* (2009.01)

(52) U.S. Cl.
CPC ............... *H04L 5/14* (2013.01); *H04W 72/04* (2013.01); *H04W 72/1289* (2013.01); *H04L 1/18* (2013.01); *H04L 5/0053* (2013.01)

(58) Field of Classification Search
CPC ......... H04W 72/1278; H04W 72/0413; H04W 72/042; H04L 5/0055; H04L 1/1812; H04L 5/14; H04L 1/18; H04L 5/0053; H04L 1/0007; H04L 1/0023; H04L 1/1806
See application file for complete search history.

(56) References Cited

U.S. PATENT DOCUMENTS

| | | | |
|---|---|---|---|
| 2012/0300641 A1* | 11/2012 | Chen | H04L 1/0026 370/241 |
| 2012/0307919 A1* | 12/2012 | Ranta | H04L 5/001 375/259 |
| 2013/0156014 A1* | 6/2013 | Kim | H04L 5/0051 370/336 |
| 2014/0126476 A1* | 5/2014 | Kang | H04W 74/006 370/328 |
| 2014/0177586 A1 | 6/2014 | Jang | |
| 2014/0204878 A1* | 7/2014 | Jang | H04L 1/0042 370/329 |
| 2014/0328260 A1* | 11/2014 | Papasakellariou | H04L 1/1887 370/329 |
| 2014/0362792 A1* | 12/2014 | Cheng | H04W 72/0413 370/329 |
| 2015/0131494 A1* | 5/2015 | He | H04B 7/046 370/280 |
| 2015/0282158 A1* | 10/2015 | Chen | H04L 5/0007 370/329 |
| 2015/0333887 A1* | 11/2015 | Papasakellariou | H04L 27/2611 370/329 |
| 2015/0358111 A1* | 12/2015 | Marinier | H04W 72/042 370/329 |
| 2016/0080129 A1 | 3/2016 | Jang et al. | |
| 2016/0212649 A1* | 7/2016 | Chen | H04W 72/0413 |
| 2016/0219618 A1* | 7/2016 | Rico Alvarino | H04W 72/1294 |
| 2017/0013615 A1 | 1/2017 | Suzuki et al. | |
| 2017/0019890 A1* | 1/2017 | Chung | H04W 72/042 |
| 2017/0347353 A1* | 11/2017 | Yerramalli | H04L 1/0031 |
| 2018/0198570 A1* | 7/2018 | Astely | H04L 1/1854 |
| 2018/0206230 A1* | 7/2018 | Cheng | H04W 72/14 |
| 2018/0263031 A1 | 9/2018 | Cheng et al. | |
| 2018/0310257 A1* | 10/2018 | Papasakellariou | H04W 72/1289 |
| 2019/0090258 A1* | 3/2019 | Ryu | H04B 7/0632 |
| 2019/0173622 A1* | 6/2019 | Xiong | H04W 76/27 |
| 2019/0335450 A1* | 10/2019 | Cheng | H04W 72/0413 |
| 2020/0260526 A1* | 8/2020 | Xiong | H04W 72/0413 |

FOREIGN PATENT DOCUMENTS

| | | | | |
|---|---|---|---|---|
| CN | 103209483 A | 7/2013 | | |
| CN | 103503347 A | 1/2014 | | |
| CN | 103563317 A | 2/2014 | | |
| CN | 106559878 A | 4/2017 | | |
| EP | 2975783 A1 | 1/2016 | | |
| KR | 20140121319 A | 10/2014 | | |
| KR | 20140121324 A | 10/2014 | | |
| WO | WO-2010124588 A1 * | 11/2010 | ........... | H04L 5/0051 |
| WO | 2013022301 A2 | 2/2013 | | |
| WO | 2015129797 A1 | 9/2015 | | |
| WO | 2016070704 A1 | 5/2016 | | |

OTHER PUBLICATIONS

XP051089779 R1-164032 Huawei et al., "Discussion on frame structure for NR", 3GPP TSG RAN WG1 Meeting #85, Nanjing, China, May 23-27, 2016, 9 pages.
XP051096206 R1-165214 NTT DOCOMO, Inc., "Views on processing time reduction and related procedures", 3GPP TSG RAN WG1 Meeting #85, Nanjing, P R. China, May 23-27, 2016, 4 pages.
Extended European Search Report issued in European Application No. 17838584.5 dated Jun. 19, 2019, 7 pages.
Office Action issued in Indian Application No. 201917004594 dated Aug. 17, 2020, 7 pages.
Office Action issued in Japanese Application No. 2019-504742 dated Feb. 25, 2020, 8 pages (with English translation).
Office Action issued in Korean Application No. 2019-7005177 dated Apr. 29, 2020, 11 pages (with English translation).
NEC Group, "Reconfiguration signalling and HARQ-timing for TDD eIMTA system," 3GPP TSG RAN WG1 Meeting #72bis, R1-131263, Chicago, USA, Apr. 15-19, 2013, 4 pages.
Office Action issued in Korean Application No. 2019-7005177 dated Oct. 30, 2020, 4 pages (with English translation).
Office Action issued in Chinese Application No. 201610657711.5 dated Sep. 15, 2022, 5 pages.

* cited by examiner

UPLINK CONTROL INFORMATION TRANSMISSION METHOD AND RELATED APPARATUS

CROSS-REFERENCE TO RELATED APPLICATIONS

This application is a continuation of International Application No. PCT/CN2017/095180, filed on Jul. 31, 2017, which claims priority to Chinese Patent Application No. 201610657711.5, filed on Aug. 10, 2016. The disclosures of the aforementioned applications are hereby incorporated by reference in their entireties.

TECHNICAL FIELD

This application relates to the communications field, and in particular, to an information transmission method and a related apparatus.

BACKGROUND

A 5G communications system or a new radio (NR) communications system is committed to supporting higher system performance, and will support different services, different deployment scenarios, and different spectrums. The different services include enhanced mobile broadband (eMBB), machine type communication (MTC), ultra-reliable and low latency communications (URLLC), Multimedia Broadcast Multicast Service (MBMS), positioning, and the like. The different deployment scenarios include scenarios such as indoor hotspot, dense urban, suburban, urban macro, a high-speed railway, and the like 5G will support a spectrum range up to 100 GHz.

Dynamic time division duplex (TDD) is an important technology in the NR communications system. The technology better matches a real-time service requirement by dynamically adjusting a transmission direction of a subframe, thereby improving spectral efficiency of the communications system and better meeting a low-latency service requirement. The NR communications system needs to be designed to enable better use of the dynamic TDD.

The 5G system will support a frequency division duplex (FDD) system and a TDD system. Both the FDD system and the TDD system need to meet performance indicators of the 5G system. In particular, both the FDD system and the TDD system need to meet a low latency, that is, need to support fast hybrid automatic repeat request (HARQ) feedback and fast retransmission. The FDD system and the TDD system also need to support flexible HARQ timing. To simplify a system design, in the 5G system, great efforts will be made to use a same design method for the FDD system and the TDD system. Therefore, how to design a same uplink control channel resource indication method for the FDD system and the TDD system is a problem that needs to be resolved in the 5G system.

SUMMARY

This application provides an information transmission method and a related apparatus, so as to enable fast HARQ-ACK feedback and fast retransmission, flexibly deal with a problem that uplink control information in different subframes requires different resources because of flexible HARQ timing, and ensure applicability in both an FDD system and a TDD system.

A first aspect of this application provides an information transmission method. Downlink control information in the method includes first information, and the first information is used to indicate a symbol that carries uplink control information. After receiving the downlink control information, a terminal device determines, based on the first information, the symbol that carries the uplink control information, maps the uplink control information to the symbol that carries the uplink control information, and sends the uplink control information to a network device. Therefore, mapping the uplink control information to the symbol that carries the uplink control information enables fast hybrid automatic repeat request feedback and fast retransmission, thereby reducing a latency; and enables use of a same solution for an FDD system and a TDD system, and enables use of a same HARQ timing transmission interval. This can not only flexibly deal with a problem that uplink control information in different subframes requires different resources because of flexible HARQ timing, but also enable a flexible change of a resource used for transmitting an uplink control channel in each subframe, thereby improving resource utilization when compared with reserving a fixed uplink control channel resource.

With reference to the first aspect, in a first implementation of the first aspect, the downlink control information further includes second information, and the second information may be used to indicate a subframe that carries the uplink control information, or may be used to indicate a subframe number of a subframe that carries the uplink control information; and that a terminal device determines, based on the first information, the symbol that carries the uplink control information includes:

determining, by the terminal device based on the second information, the subframe that carries the uplink control information; and determining, by the terminal device based on the first information, the symbol that carries the uplink control information and that is in the subframe that carries the uplink control information.

With reference to the first aspect or the first implementation of the first aspect, in a second implementation of the first aspect, the downlink control information further includes third information, and the third information is used to indicate a frequency-domain resource and/or a code resource corresponding to an uplink control channel that carries the uplink control information and that is on the symbol carrying the uplink control information; or the third information is used to indicate an uplink control channel index corresponding to an uplink control channel that carries the uplink control information and that is on the symbol carrying the uplink control information.

With reference to the first aspect, the first implementation of the first aspect, or the second implementation of the first aspect, in a third implementation of the first aspect, that the first information is used to indicate a symbol that carries uplink control information may be as follows: The first information is used to indicate a start symbol that carries the uplink control information.

With reference to any one of the first aspect, or the first to the third implementations of the first aspect, in a fourth implementation of the first aspect, the downlink control information further includes fourth information, the fourth information is used to indicate an end symbol that carries the uplink control information, and the terminal device may determine, based on the fourth information, the end symbol that carries the uplink control information.

With reference to any one of the first aspect, or the first to the fourth implementations of the first aspect, in a fifth implementation of the first aspect, the first information is corresponding to a 2-bit information field, and that a terminal device determines, based on the first information, the symbol that carries the uplink control information may be:

if the 2-bit information field corresponding to the first information is 00, determining, by the terminal device, that the symbol that carries the uplink control information is a last symbol in the subframe that carries the uplink control information;

if the 2-bit information field corresponding to the first information is 01, determining, by the terminal device, that the symbol that carries the uplink control information is a penultimate symbol in the subframe that carries the uplink control information;

if the 2-bit information field corresponding to the first information is 10, determining, by the terminal device, that the symbol that carries the uplink control information is a second symbol in the subframe that carries the uplink control information; or if the 2-bit information field corresponding to the first information is 11, determining, by the terminal device, that the symbol that carries the uplink control information is a third symbol in the subframe that carries the uplink control information.

With reference to any one of the first aspect, or the first to the fourth implementations of the first aspect, in a sixth implementation of the first aspect, the first information is corresponding to a 3-bit information field, and the subframe that carries the uplink control information includes seven symbols; or the first information is corresponding to a 4-bit information field, and the subframe that carries the uplink control information includes 14 symbols, where the symbol may be a time-domain symbol, for example, may be an orthogonal frequency division multiplexing symbol, or may be a single carrier frequency division multiple access symbol.

With reference to any one of the first aspect, or the first to the sixth implementations of the first aspect, in a seventh implementation of the first aspect, the downlink control information is used to schedule downlink shared channel transmission, and the uplink control information is a hybrid automatic repeat request corresponding to the downlink shared channel transmission.

With reference to the seventh implementation of the first aspect, in an eighth implementation of the first aspect, a subframe that carries the downlink control information is of a fourth subframe type, a subframe that carries the downlink shared channel transmission is of a third subframe type, and both the third subframe type and the fourth subframe type include a symbol used for downlink transmission, a guard period, and a symbol used for uplink transmission; the symbol used for downlink transmission in the third subframe type is mainly used for downlink control channel transmission and downlink data transmission, and the symbol used for uplink transmission in the third subframe type is mainly used for uplink control information transmission and/or uplink reference signal transmission, for example, is used for SRS transmission; and the symbol used for downlink transmission in the fourth subframe type is mainly used for downlink control channel transmission, and the symbol used for uplink transmission in the fourth subframe type is mainly used for uplink data transmission, uplink control information transmission, and uplink reference signal transmission.

With reference to the seventh implementation of the first aspect, in a ninth implementation of the first aspect, the downlink control information is carried in a subframe n, the downlink shared channel transmission is carried in a subframe n+k1, and the uplink control information is carried in a subframe n+k1+k0, where k1 is an integer greater than or equal to 1, and k0 is an integer greater than or equal to 0; a value of k0 may be determined based on the second information; and the downlink control information may include sixth information, and the sixth information is used to indicate a value of k1.

With reference to any one of the first aspect, or the first to the sixth implementations of the first aspect, in a tenth implementation of the first aspect, the downlink control information further includes fifth information, the fifth information is used to trigger reporting of channel state information, and the uplink control information is the channel state information.

A second aspect of this application provides an information transmission method. Downlink control information in the method includes first information, and the first information is used to indicate a symbol that carries uplink control information. A network device sends the downlink control information, and receives, on the symbol that carries the uplink control information, the uplink control information sent by a terminal device. This enables fast hybrid automatic repeat request feedback and fast retransmission, thereby reducing a latency; and enables use of a same solution for an FDD system and a TDD system, and enables use of a same HARQ timing transmission interval. This can not only flexibly deal with a problem that uplink control information in different subframes requires different resources because of flexible HARQ timing, but also enable a flexible change of a resource used for transmitting an uplink control channel in each subframe, thereby improving resource utilization when compared with reserving a fixed uplink control channel resource.

With reference to the second aspect, in a first implementation of the second aspect, the downlink control information further includes second information, and the second information may be used to indicate a subframe that carries the uplink control information, or may be used to indicate a subframe number of a subframe that carries the uplink control information.

With reference to the second aspect or the first implementation of the second aspect, in a second implementation of the second aspect, the downlink control information further includes third information, and the third information is used to indicate a frequency-domain resource and/or a code resource corresponding to an uplink control channel that carries the uplink control information and that is on the symbol carrying the uplink control information; or the third information is used to indicate an uplink control channel index corresponding to an uplink control channel that carries the uplink control information and that is on the symbol carrying the uplink control information.

With reference to the second aspect, the first implementation of the second aspect, or the second implementation of the second aspect, in a third implementation of the second aspect, the symbol that carries the uplink control information is a start symbol that carries the uplink control information.

With reference to the third implementation of the second aspect, in a fourth implementation of the second aspect, the downlink control information includes fourth information, the fourth information is used to indicate an end symbol that carries the uplink control information, and the terminal device may determine, based on the fourth information, the end symbol that carries the uplink control information.

With reference to any one of the second aspect, or the first to the fourth implementations of the second aspect, in a fifth implementation of the second aspect, the first information is corresponding to a 2-bit information field; and the symbol that carries the uplink control information is as follows:

if the 2-bit information field corresponding to the first information is 00, the symbol that carries the uplink control information is a last symbol in the subframe that carries the uplink control information;

if the 2-bit information field corresponding to the first information is 01, the symbol that carries the uplink control information is a symbol before a last symbol in the subframe that carries the uplink control information;

if the 2-bit information field corresponding to the first information is 10, the symbol that carries the uplink control information is a second symbol in the subframe that carries the uplink control information; or if the 2-bit information field corresponding to the first information is 11, the symbol that carries the uplink control information is a third symbol in the subframe that carries the uplink control information.

With reference to any one of the second aspect, or the first to the fourth implementations of the second aspect, in a sixth implementation of the second aspect, the first information is corresponding to a 3-bit information field, and the subframe that carries the uplink control information includes seven symbols; or the first information is corresponding to a 4-bit information field, and the subframe that carries the uplink control information includes 14 symbols, where the symbol may be a time-domain symbol, for example, may be an orthogonal frequency division multiplexing symbol, or may be a single carrier frequency division multiple access symbol.

With reference to any one of the second aspect, or the first to the sixth implementations of the second aspect, in a seventh implementation of the second aspect, the downlink control information is used to schedule downlink shared channel transmission, and the uplink control information is a hybrid automatic repeat request corresponding to the downlink shared channel transmission.

With reference to the seventh implementation of the second aspect, in an eighth implementation of the second aspect, a subframe that carries the downlink control information is of a fourth subframe type, a subframe that carries the downlink shared channel transmission is of a third subframe type, and both the third subframe type and the fourth subframe type include a symbol used for downlink transmission, a guard period, and a symbol used for uplink transmission; the symbol used for downlink transmission in the third subframe type is mainly used for downlink control channel transmission and downlink data transmission, and the symbol used for uplink transmission in the third subframe type is mainly used for uplink control information transmission and/or uplink reference signal transmission, for example, is used for SRS transmission; and the symbol used for downlink transmission in the fourth subframe type is mainly used for downlink control channel transmission, and the symbol used for uplink transmission in the fourth subframe type is mainly used for uplink data transmission, uplink control information transmission, and uplink reference signal transmission.

With reference to the seventh implementation of the second aspect, in a ninth implementation of the second aspect, the downlink control information is carried in a subframe n, the downlink shared channel transmission is carried in a subframe n+k1, and the uplink control information is carried in a subframe n+k1+k0, where k1 is an integer greater than or equal to 1, and k0 is an integer greater than or equal to 0; a value of the k0 may be determined based on the second information; and the downlink control information may include sixth information, and the sixth information is used to indicate a value of k1.

With reference to any one of the second aspect, or the first to the sixth implementations of the second aspect, in a tenth implementation of the second aspect, the downlink control information includes fifth information, the fifth information is used to trigger reporting of channel state information, and the uplink control information is the channel state information.

A third aspect of this application provides an information transmission apparatus, and the information transmission apparatus includes at least one unit configured to perform the information transmission method provided in any one of the first aspect or the implementations of the first aspect.

A fourth aspect of this application provides an information transmission apparatus, and the information transmission apparatus includes at least one unit configured to perform the information transmission method provided in any one of the second aspect or the implementations of the second aspect.

A fifth aspect of this application provides a storage medium, and the storage medium stores program code. When running the program code, a terminal device performs the information transmission method provided in any one of the first aspect or the implementations of the first aspect. The storage medium includes but is not limited to a flash memory, a hard disk (HDD), or a solid state drive (SSD).

A sixth aspect of this application provides a storage medium, and the storage medium stores program code. When running the program code, a network device performs the information transmission method in any one of the second aspect or the implementations of the second aspect. The storage medium includes but is not limited to a flash memory, a hard disk, or a solid state disk.

A seventh aspect of this application provides a communications apparatus, including a processor and a memory. The memory stores a computer instruction, and the processor executes the computer instruction stored in the memory, so that the apparatus implements the information transmission method provided in any one of the first aspect or the implementations of the first aspect.

With reference to the seventh aspect, in a first implementation of the seventh aspect, the communications apparatus further includes a transceiver.

An eighth aspect of this application provides a communications apparatus, including a processor and a memory. The memory stores a computer instruction, and the processor executes the computer instruction stored in the memory, so that the apparatus implements the information transmission method provided in any one of the second aspect or the implementations of the second aspect.

With reference to the eighth aspect, in a first implementation of the eighth aspect, the communications apparatus further includes a transceiver.

DESCRIPTION OF EMBODIMENTS

Figure 1:
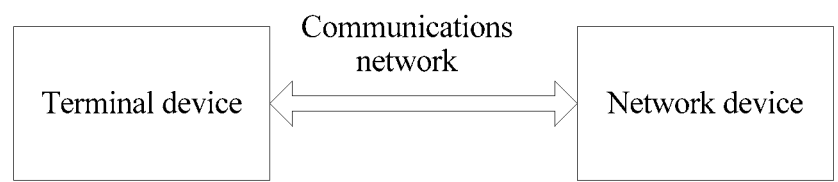
FIG. 1 is a schematic architectural diagram of a communications system according to this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device. The following describes the technical solutions in the embodiments of this application with reference to the accompanying drawings in the embodiments of this application.

In this specification, a frame structure corresponding to a 5G communications system may include four subframe types. A first subframe type is a downlink subframe, a second subframe type is an uplink subframe. Both a third subframe type and a fourth subframe type include a symbol used for downlink transmission, a guard period (GP), and a symbol used for uplink transmission. The third subframe type and the fourth subframe type may be considered as a same subframe type. The symbol used for downlink transmission in the third subframe type is mainly used for downlink control channel transmission and downlink data transmission, and the symbol used for uplink transmission in the third subframe type is mainly used for uplink control information transmission and/or uplink reference signal transmission, for example, is used for sounding reference signal (SRS) transmission. The symbol used for downlink transmission in the fourth subframe type is mainly used for downlink control channel transmission, and the symbol used for uplink transmission in the fourth subframe type is mainly used for uplink data transmission, uplink control information transmission, and uplink reference signal transmission. The third subframe type may also be referred to as a primary downlink subframe (such as: DL dominant subframe or DL centric subframe), and the fourth subframe type may also be referred to as a primary uplink subframe (such as: UL dominant subframe, or UL centric subframe). A quantity of time-domain symbols used for downlink transmission in the third subframe type may be greater than or equal to that of time-domain symbols used for uplink transmission, and a quantity of time-domain symbols used for downlink transmission in the fourth subframe type may be less than that of time-domain symbols used for uplink transmission.

In a 5G system, a user plane latency is an important indicator. In design of the 5G system, great efforts will be made to minimize the user plane latency. In the 5G system, great efforts will be made to enable fast hybrid automatic repeat request feedback and enable fast retransmission, so as to reduce a latency. How the 5G system enables fast hybrid automatic repeat request feedback and enables fast retransmission is a problem that needs to be resolved.

As described above, the 5G system will support transmission corresponding to different services and different user capabilities. For different users and different user capabilities, different HARQ timing may be used. To meet different requirements, the 5G system will support flexible HARQ timing. The flexible HARQ timing may result in different HARQ-ACK feedback quantities corresponding to different subframes, and therefore in some subframes, a small quantity of resources are required for feedback of uplink control information, and in some subframes, a large quantity of resources are required for feedback of uplink control information. How to design an uplink control channel resource indication method to deal with flexible HARQ timing is a problem that needs to be resolved.

The 5G system will support an FDD system and a TDD system. An FDD system frame structure will be mainly based on a first subframe type and a second subframe type, and a TDD system frame structure will be based on all subframe types. Both the FDD system and the TDD system need to meet performance indicators of the 5G system. In particular, both the FDD system and the TDD system need to meet a low latency, that is, need to support fast hybrid automatic repeat request feedback and fast retransmission. The FDD system and the TDD system also need to support flexible HARQ timing. To simplify a system design, in the 5G system, great efforts will be made to use a same design method for the FDD system and the TDD system. How to design a same uplink control channel resource indication method for the FDD system and the TDD system is a problem that needs to be resolved in the 5G system.

This application provides an information transmission method, and specifically, provides an uplink control channel resource indication method, so as to enable fast HARQ-ACK feedback and fast retransmission, flexibly deal with a problem that uplink control information in different subframes requires different resources because of flexible HARQ timing, and ensure applicability in both an FDD system and a TDD system.

An architecture of a communications system applied in the embodiments of this application is described below.

Various technologies described in this application may be used for various communications systems, including a 2G communications system such as a Global System for Mobile Communications (GSM), 3G communications systems such as a Wideband Code Division Multiple Access (WCDMA) system and a Time Division-Synchronous Code Division Multiple Access (TD-SCDM) system, and next-generation communications systems such as a Long Term Evolution (LTE) communications system and a subsequent evolved system of the LTE communications systems. This application is mainly applied to a 5G communications system, an LTE system, or an LTE-evolved system. This application can be applied to a single-carrier system and a multi-carrier system.

FIG. 1 is a schematic architectural diagram of a communications system applied in an embodiment of this application. Network elements used in the communications system include a terminal device and a network device, and a communications network is established between the terminal device and the network device for communication. The terminal device in this embodiment of this application may be user equipment (UE), and may be specifically user equipment that performs communication in the foregoing communications system. For example, the terminal device may be a mobile phone (such as a handset) or a tablet computer, a computer, or the like that has a call function. For example, the terminal device may alternatively be an in-vehicle call apparatus, or the like. This is not limited herein. The network device in this embodiment of this application is configured to communicate with the terminal device in the foregoing communications system. For example, the network device may be a base station, and may be specifically a base station in a narrow sense, that is, a public mobile communications base station, or may be specifically a base station in a broad sense, that is, a base station subsystem. This is not limited herein. For example, the base station may be an eNB (E-UTRAN NodeB) or a BS (Base Station).

Figure 2:
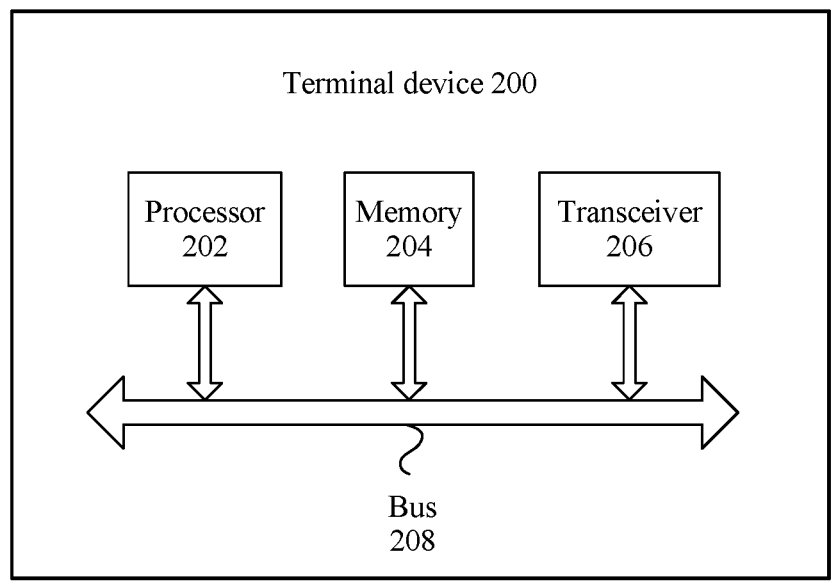
FIG. 2 is a schematic diagram of an organizational structure of a terminal device according to this application.

The terminal device in FIG. 1 may be implemented by using a terminal device 200 in FIG. 2. A schematic diagram of an organizational structure of the terminal device 200 is shown in FIG. 2. The terminal device 200 includes a processor 202, a memory 204, and a transceiver 206, and may further include a bus 208.

Communications connections among the processor 202, the memory 204, and the transceiver 206 may be implemented by using the bus 208, or communication among the processor 202, the memory 204, and the transceiver 206 may be implemented by using other means such as wireless transmission.

The memory 204 may include a volatile memory, for example, a random access memory (RAM). The memory may also include a non-volatile memory, for example, a read-only memory (ROM), a flash memory, a hard disk (HDD), or a solid-state drive (SSD). Alternatively, the memory 204 may include a combination of the foregoing types of memories. When technical solutions provided in this application are implemented by using software, program code that is used to implement an information transmission method provided in FIG. 3 in this application is stored in the memory 204, and is executed by the processor 202.

The terminal device 200 communicates with the network device by using the transceiver 206.

The processor 202 may be a central processing unit (CPU).

Downlink control information (DCI) in this embodiment of this application includes first information, and the first information is used to indicate a symbol that carries uplink control information (UCI). After receiving the downlink control information by using the transceiver 206, the processor 202 determines, based on the first information, the symbol that carries the uplink control information, maps the uplink control information to the symbol that carries the uplink control information, and sends the uplink control information to the network device by using the transceiver 206. Therefore, mapping the uplink control information to the symbol that carries the uplink control information enables fast hybrid automatic repeat request feedback and fast retransmission, thereby reducing a latency; and enables use of a same solution for an FDD system and a TDD system, and enables use of a same HARQ timing transmission interval. This can not only flexibly deal with a problem that uplink control information in different subframes requires different resources because of flexible HARQ timing, but also enable a flexible change of a resource used for transmitting an uplink control channel in each subframe, thereby improving resource utilization when compared with reserving a fixed uplink control channel resource.

Optionally, the downlink control information further includes second information, and the second information is used to indicate a subframe that carries the uplink control information; and that the processor 202 is configured to determine, based on the first information, the symbol that carries the uplink control information includes:

the processor 202 is configured to: determine, based on the second information, the subframe that carries the uplink control information; and determine, based on the first information, the symbol that carries the uplink control information and that is in the subframe that carries the uplink control information.

Optionally, the downlink control information further includes third information, and the third information is used to indicate a frequency-domain resource and/or a code resource corresponding to an uplink control channel that carries the uplink control information and that is on the symbol carrying the uplink control information.

Optionally, the symbol that carries the uplink control information is a start symbol that carries the uplink control information.

Optionally, the downlink control information further includes fourth information, and the fourth information is used to indicate an end symbol that carries the uplink control information; and the processor 202 is further configured to:

determine, based on the fourth information, the end symbol that carries the uplink control information.

Optionally, the first information is corresponding to a 2-bit information field, and that the processor 202 is configured to determine, based on the first information, the symbol that carries the uplink control information includes:

the processor 202 is configured to:

if the 2-bit information field corresponding to the first information is 00, determine that the symbol that carries the uplink control information is a last symbol in the subframe that carries the uplink control information;

if the 2-bit information field corresponding to the first information is 01, determine that the symbol that carries the uplink control information is a penultimate symbol in the subframe that carries the uplink control information;

if the 2-bit information field corresponding to the first information is 10, determine that the symbol that carries the uplink control information is a second symbol in the subframe that carries the uplink control information; or if the 2-bit information field corresponding to the first information is 11, determine that the symbol that carries the uplink control information is a third symbol in the subframe that carries the uplink control information.

Optionally, the first information is corresponding to a 3-bit information field, and the subframe that carries the uplink control information includes seven symbols; or the first information is corresponding to a 4-bit information field, and the subframe that carries the uplink control information includes 14 symbols.

Optionally, the downlink control information is used to schedule downlink shared channel transmission, and the uplink control information is a hybrid automatic repeat request corresponding to the downlink shared channel transmission.

Optionally, a subframe that carries the downlink control information is of a fourth subframe type, a subframe that carries the downlink shared channel transmission is of a third subframe type, and both the third subframe type and the fourth subframe type include a symbol used for downlink transmission, a guard period, and a symbol used for uplink transmission.

Optionally, the downlink control information is carried in a subframe n, the downlink shared channel transmission is carried in a subframe n+k1, and the uplink control information is carried in a subframe n+k1+k0, where k1 is an integer greater than or equal to 1, and k0 is an integer greater than or equal to 0.

Optionally, the downlink control information further includes fifth information, the fifth information is used to trigger reporting of channel state information, and the uplink control information is the channel state information.

Figure 3:
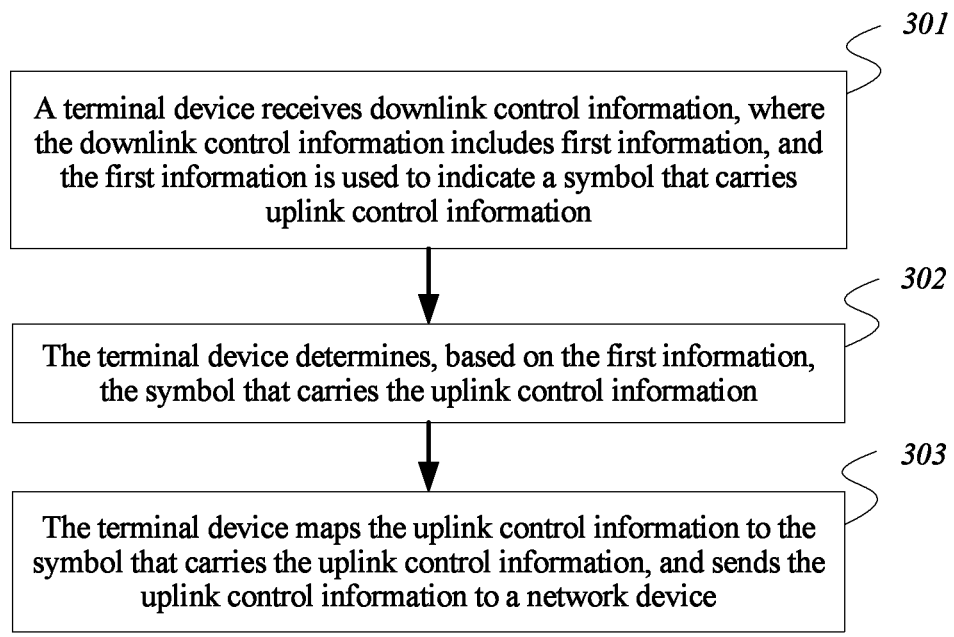
FIG. 3 is a schematic flowchart of an information transmission method according to this application.

This application further provides an information transmission method. The terminal devices in FIG. 1 and in FIG. 2 perform the method during running, and a schematic flowchart of the method is shown in FIG. 3.

301. A terminal device receives downlink control information, where the downlink control information includes first information, and the first information is used to indicate a symbol that carries uplink control information.

In this step, that a terminal device receives downlink control information, where the downlink control information includes first information, and the first information is used to indicate a symbol that carries uplink control information may be:

receiving, by the terminal device, a downlink control channel, where downlink control information carried in the downlink control channel includes the first information, and the first information is used to indicate the symbol that carries the uplink control information.

Alternatively, that a terminal device receives downlink control information, where the downlink control information includes first information, and the first information is used to indicate a symbol that carries uplink control information may be:

receiving, by the terminal device, a downlink control channel, where a downlink control information format corresponding to the downlink control channel includes a first information field, and the first information field is used to indicate the symbol that carries the uplink control information.

Alternatively, that a terminal device receives downlink control information, where the downlink control information includes first information, and the first information is used to indicate a symbol that carries uplink control information may be:

detecting, by the terminal device, a downlink control information format, where the downlink control information format includes a first information field, and the first information field is used to indicate the symbol that carries the uplink control information.

Further, optionally, the downlink control information further includes second information, and the second information is used to indicate a subframe that carries the uplink control information. Specifically, if the downlink control information is carried in a subframe n, the uplink control information is carried in a subframe n+k0, k0 is an integer greater than or equal to 0, where a value of k0 is determined based on the second information. The second information is used to indicate the subframe that carries the uplink control information, or the second information may be used to indicate a subframe number of the subframe that carries the uplink control information.

Further, optionally, the downlink control information further includes third information. The third information is used to indicate a frequency-domain resource and/or a code resource corresponding to an uplink control channel that carries the uplink control information and that is on the symbol carrying the uplink control information; or the third information is used to indicate an uplink control channel index corresponding to an uplink control channel that carries the uplink control information and that is on the symbol carrying the uplink control information, and the uplink control channel index is used by the terminal device to determine, based on the uplink control channel index, a frequency-domain resource and/or a code resource corresponding to the uplink control channel. The code resource may be a cyclic shift and/or an orthogonal spreading code of a sequence corresponding to the uplink control channel.

Further, optionally, that the first information is used to indicate the symbol that carries the uplink control information may be as follows: The first information is used to indicate a start symbol that carries the uplink control information. In this case, the downlink control information may further include fourth information, and the fourth information is used to indicate an end symbol that carries the uplink control information.

Further, optionally, the first information is corresponding to a 2-bit information field, and that the first information is used to indicate the symbol that carries the uplink control information may be as follows:

if the 2-bit information field corresponding to the first information is 00, the symbol that carries the uplink control information is a last symbol in the subframe that carries the uplink control information;

if the 2-bit information field corresponding to the first information is 01, the symbol that carries the uplink control information is a penultimate symbol, that is, a symbol before a last symbol in the subframe that carries the uplink control information;

if the 2-bit information field corresponding to the first information is 10, the symbol that carries the uplink control information is a second symbol in the subframe that carries the uplink control information; or if the 2-bit information field corresponding to the first information is 11, the symbol that carries the uplink control information is a third symbol in the subframe that carries the uplink control information.

Alternatively, that the first information is used to indicate the symbol that carries the uplink control information may be as follows:

if the 2-bit information field corresponding to the first information is 11, the symbol that carries the uplink control information is a last symbol in the subframe that carries the uplink control information;

if the 2-bit information field corresponding to the first information is 10, the symbol that carries the uplink control information is a penultimate symbol, that is, a symbol before a last symbol in the subframe that carries the uplink control information;

if the 2-bit information field corresponding to the first information is 00, the symbol that carries the uplink control information is a second symbol in the subframe that carries the uplink control information; or if the 2-bit information field corresponding to the first information is 01, the symbol that carries the uplink control information is a third symbol in the subframe that carries the uplink control information.

Alternatively, that the first information is used to indicate the symbol that carries the uplink control information may be as follows:

if the 2-bit information field corresponding to the first information is 00, the symbol that carries the uplink control information is a last symbol in the subframe that carries the uplink control information;

if the 2-bit information field corresponding to the first information is 01, the symbol that carries the uplink control information is a penultimate symbol, that is, a symbol before a last symbol in the subframe that carries the uplink control information;

if the 2-bit information field corresponding to the first information is 10, the symbol that carries the uplink control information is a second symbol in the subframe that carries the uplink control information; or if the 2-bit information field corresponding to the first information is 11, the symbol that carries the uplink control information is all symbols, used for uplink transmission, in the subframe that carries the uplink control information.

Further, optionally, the first information is corresponding to a 3-bit information field, and that the first information is used to indicate the symbol that carries the uplink control information may be as follows:

if the 3-bit information field corresponding to the first information is 000, the symbol that carries the uplink control information is a first symbol in the subframe that carries the uplink control information;

if the 3-bit information field corresponding to the first information is 001, the symbol that carries the uplink control information is a second symbol in the subframe that carries the uplink control information;

if the 3-bit information field corresponding to the first information is 010, the symbol that carries the uplink control information is a third symbol in the subframe that carries the uplink control information;

if the 3-bit information field corresponding to the first information is 011, the symbol that carries the uplink control information is a fourth symbol in the subframe that carries the uplink control information;

if the 3-bit information field corresponding to the first information is 100, the symbol that carries the uplink control information is a fifth symbol in the subframe that carries the uplink control information;

if the 3-bit information field corresponding to the first information is 101, the symbol that carries the uplink control information is a sixth symbol in the subframe that carries the uplink control information;

if the 3-bit information field corresponding to the first information is 110, the symbol that carries the uplink control information is a seventh symbol in the subframe that carries the uplink control information; or if the 3-bit information field corresponding to the first information is 111, the symbol that carries the uplink control information is all symbols, used for uplink transmission, in the subframe that carries the uplink control information, or the field is in a reservation state (that is, meaningless).

In this case, the subframe that carries the uplink control information may include seven symbols.

Further, optionally, the first information is corresponding to a 4-bit information field, and that the first information is used to indicate the symbol that carries the uplink control information may be as follows:

if the 4-bit information field corresponding to the first information is 0000, the symbol that carries the uplink control information is a first symbol in the subframe that carries the uplink control information;

if the 4-bit information field corresponding to the first information is 0001, the symbol that carries the uplink control information is a second symbol in the subframe that carries the uplink control information;

if the 4-bit information field corresponding to the first information is 0010, the symbol that carries the uplink control information is a third symbol in the subframe that carries the uplink control information;

if the 4-bit information field corresponding to the first information is 0011, the symbol that carries the uplink control information is a fourth symbol in the subframe that carries the uplink control information;

if the 4-bit information field corresponding to the first information is 0100, the symbol that carries the uplink control information is a fifth symbol in the subframe that carries the uplink control information;

if the 4-bit information field corresponding to the first information is 0101, the symbol that carries the uplink control information is a sixth symbol in the subframe that carries the uplink control information;

if the 4-bit information field corresponding to the first information is 0110, the symbol that carries the uplink control information is a seventh symbol in the subframe that carries the uplink control information;

if the 4-bit information field corresponding to the first information is 0111, the symbol that carries the uplink control information is an eighth symbol in the subframe that carries the uplink control information;

if the 4-bit information field corresponding to the first information is 1000, the symbol that carries the uplink control information is a ninth symbol in the subframe that carries the uplink control information;

if the 4-bit information field corresponding to the first information is 1001, the symbol that carries the uplink control information is a tenth symbol in the subframe that carries the uplink control information;

if the 4-bit information field corresponding to the first information is 1010, the symbol that carries the uplink control information is an eleventh symbol in the subframe that carries the uplink control information;

if the 4-bit information field corresponding to the first information is 1011, the symbol that carries the uplink control information is a twelfth symbol in the subframe that carries the uplink control information;

if the 4-bit information field corresponding to the first information is 1100, the symbol that carries the uplink control information is a thirteenth symbol in the subframe that carries the uplink control information;

if the 4-bit information field corresponding to the first information is 1101, the symbol that carries the uplink control information is a fourteenth symbol in the subframe that carries the uplink control information; or if the 4-bit information field corresponding to the first information is 1110 or 1111, the symbol that carries the uplink control information is all symbols, used for uplink transmission, in the subframe that carries the uplink control information, or the field is in a reservation state (that is, meaningless).

In this case, the subframe that carries the uplink control information may include 14 symbols.

Further, optionally, the downlink control information is used to schedule downlink shared channel transmission, and the uplink control information is a hybrid automatic repeat request corresponding to the downlink shared channel transmission.

Further, optionally, the downlink control information is carried in a subframe n, the downlink shared channel transmission is carried in a subframe n+k1, and the uplink control information is carried in a subframe n+k1+k0, where k1 is an integer greater than or equal to 1, and k0 is an integer greater than or equal to 0; a value of k0 may be determined based on the second information; and the downlink control information may include sixth information, and the sixth information is used to indicate a value of k1.

Further, optionally, the subframe that carries the downlink control information is of a fourth subframe type, and the subframe that carries the downlink shared channel transmission is of a third subframe type. A symbol used for downlink transmission in the third subframe type is mainly used for downlink control channel transmission and downlink data transmission, and a symbol used for uplink transmission in the third subframe type is mainly used for uplink control information transmission and/or uplink reference signal transmission, for example, is used for SRS transmission. A symbol used for downlink transmission in the fourth subframe type is mainly used for downlink control channel transmission, and a symbol used for uplink transmission in the fourth subframe type is mainly used for uplink data transmission, uplink control information transmission, and uplink reference signal transmission.

Further, optionally, the downlink control information includes fifth information, the fifth information is used to trigger reporting of channel state information, and the uplink control information is the channel state information.

Further, optionally, the downlink control information includes sixth information, the sixth information is used to trigger reporting of beam information, and the uplink control information is the beam information. The beam information may include a beam (beam) index and/or an RSRP (Reference Signal Received Power) corresponding to the beam.

Further, optionally, the downlink control information includes seventh information, the seventh information is used to trigger reporting of an SRS, and the uplink control information is the SRS.

In all embodiments of this application, a subframe may be replaced with a transmission time unit, or may be replaced with a transmission time interval, or may be replaced with a resource unit.

In all the embodiments of this application, a symbol may be a time-domain symbol, for example, may be an orthogonal frequency division multiplexing (OFDM) symbol, or may be a single carrier frequency division multiple access (SC-FDMA) symbol.

Figure 4:
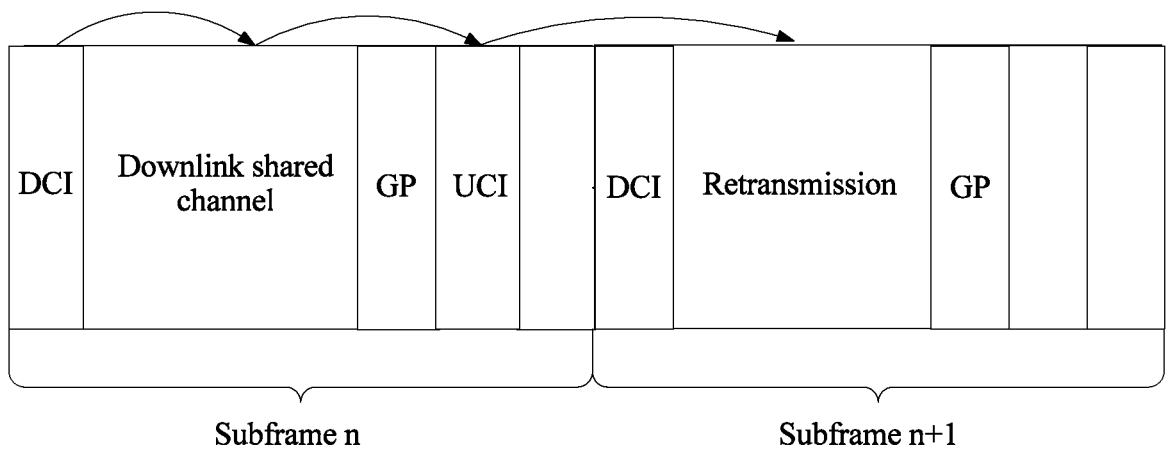
FIG. 4 is a schematic diagram of a subframe type according to this application.

A specific embodiment of this step is shown in FIG. 4. FIG. 4 is a schematic diagram of a subframe type in a TDD system. In FIG. 4, the downlink control information is carried in a first symbol of a subframe n, the downlink control information is used to schedule the downlink shared channel transmission, and the downlink shared channel transmission is carried in the subframe n. The downlink control information includes first information, and the first information indicates that a hybrid automatic repeat request corresponding to the downlink shared channel transmission is transmitted on a penultimate symbol of the subframe n. If an error occurs during the downlink shared channel transmission, retransmission corresponding to the downlink shared channel is carried in a subframe n+1, and downlink control information corresponding to the retransmission is carried on a first symbol of the subframe n+1. n is a subframe number, and n is an integer greater than or equal to 0. In FIG. 4, the downlink control information carried in the subframe n indicates that the hybrid automatic repeat request corresponding to the downlink shared channel transmission scheduled by using the downlink control information is transmitted on the penultimate symbol of the subframe n, so that a processing time of one symbol (a last symbol of the subframe n) is reserved for a network device side, and retransmission can be scheduled on the first symbol of the subframe n+1, thereby enabling fast retransmission. If the symbol that carries the uplink control information is not indicated by using the first information, and the uplink control information is transmitted only in the last symbol of the subframe n in a predefined manner, a base station cannot schedule retransmission in the subframe n+1 because no processing time is reserved, and an earliest time at which retransmission can be scheduled is only a subframe n+2, and therefore a latency is increased. If the uplink control information is transmitted only on the penultimate symbol of the subframe n in a predefined manner, fast retransmission can be enabled, but the last symbol of the subframe n cannot be efficiently used, causing relatively low resource utilization.

In this embodiment of this application, the downlink control information includes the first information, and the first information is used to indicate the symbol that carries the uplink control information, so that fast hybrid automatic repeat request feedback and fast retransmission are enabled, thereby reducing a latency.

Figure 5:
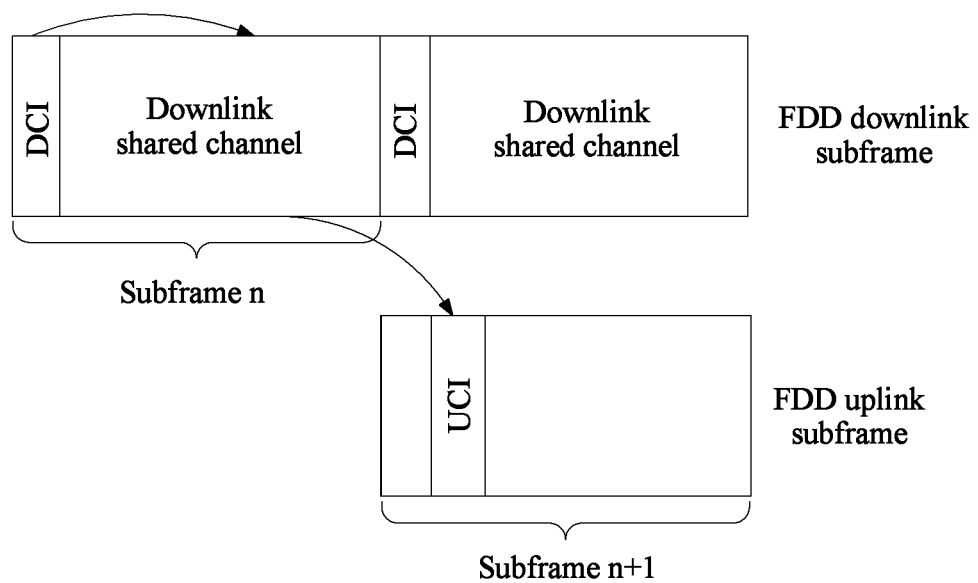
FIG. 5 is a schematic diagram of a subframe type according to this application.

Another specific embodiment of this step is shown in FIG. 5. FIG. 5 is a schematic diagram of a subframe type in an FDD system. In FIG. 5, the downlink control information is carried in a first symbol of a subframe n, the downlink control information is used to schedule downlink shared channel transmission, and the downlink shared channel transmission is carried in the subframe n. The downlink control information includes first information, and the first information indicates that a hybrid automatic repeat request corresponding to the downlink shared channel transmission is transmitted on a second symbol of a subframe n+1. In the FDD system, a subframe type mainly includes a downlink subframe and an uplink subframe. An end symbol of a downlink shared channel transmitted in the subframe n is located on a last symbol of the subframe n, and the first information included in the downlink control information carried in the subframe n is used to indicate that the hybrid automatic repeat request corresponding to the downlink shared channel is transmitted on a second symbol of the subframe n+1, so that there is only one symbol between the downlink shared channel transmission and hybrid automatic repeat request transmission, thereby enabling fast hybrid automatic repeat request transmission. With reference to FIG. 4, it can be learned that there is a GP of only one symbol between the downlink shared channel transmission in the subframe n and transmission of the hybrid automatic repeat request corresponding to the downlink shared channel transmission. Therefore, a same uplink control channel resource indication method is implemented, and same HARQ timing for FDD and TDD is implemented.

In this embodiment of this application, the downlink control information includes the first information, and the first information is used to indicate the symbol that carries the uplink control information, so that a same solution can be used for the FDD system and the TDD system, and use of a same HARQ timing transmission interval is enabled.

Figure 6:
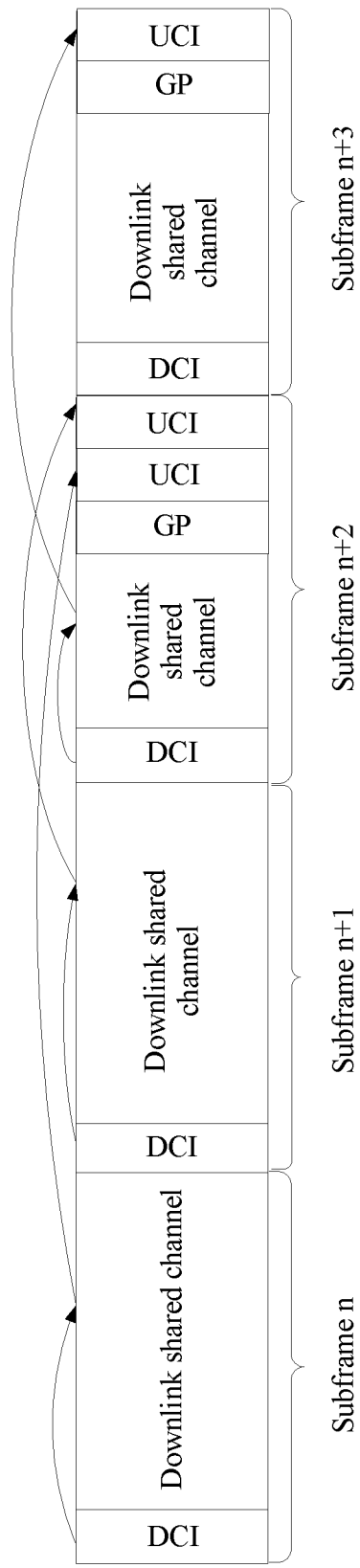
FIG. 6 is a schematic diagram of a subframe type according to this application.

Another specific embodiment of this step is shown in FIG. 6. In FIG. 6, a subframe n and a subframe n+1 are downlink subframes, and a subframe n+2 and a subframe n+3 are of a third subframe type. Downlink control information carried in a subframe n is carried in a first symbol of the subframe n, the downlink control information is used to schedule downlink shared channel transmission, and the downlink shared channel transmission is carried in the subframe n, where the downlink control information includes first information, and the first information indicates that a hybrid automatic repeat request corresponding to the downlink shared channel transmission is transmitted on a penultimate symbol of a subframe n+2. Downlink control information carried in a subframe n+1 is carried in a first symbol of the subframe n+1, the downlink control information is used to schedule downlink shared channel transmission, and the downlink shared channel transmission is carried in the subframe n+1, where the downlink control information includes first information, and the first information indicates that a hybrid automatic repeat request corresponding to the downlink shared channel transmission is transmitted on a last symbol of the subframe n+2. Downlink control information carried in the subframe n+2 is carried in a first symbol of the subframe n+2, the downlink control information is used to schedule downlink shared channel transmission, and the downlink shared channel transmission is carried in the subframe n+2, where the downlink control information includes first information, and the first information indicates that a hybrid automatic repeat request corresponding to the downlink shared channel transmission is transmitted on a last symbol of a subframe n+3. In the embodiment shown in FIG. 6, because the subframe n+2 needs to carry the hybrid automatic repeat request corresponding to the subframe+n and the hybrid automatic repeat request corresponding to the subframe n+1, a relatively large quantity of uplink control channel resources are required. In this embodiment, the first information is used to indicate the symbol that carries the uplink control information, so that both the hybrid automatic repeat request corresponding to the subframe n and the hybrid automatic repeat request corresponding to the subframe n+1 can be transmitted in the subframe n+2, and two symbols of the subframe n+2 are used for uplink control channel transmission. In the embodiment shown in FIG. 6, in the subframe n+3, only the hybrid automatic repeat request corresponding to the downlink shared channel transmission carried in the subframe n+2 needs to be reported. Therefore, the first information included in the downlink control information carried in the subframe n+2 indicates that the hybrid automatic repeat request is transmitted on the last symbol of the subframe n+3, so that only one symbol of the subframe n+3 is used for uplink control channel transmission.

In this embodiment of this application, the downlink control information includes the first information, and the first information is used to indicate the symbol that carries the uplink control information. This can not only flexibly deal with a problem that uplink control information in different subframes requires different resources because of flexible HARQ timing, but also enable a flexible change of a resource used for transmitting an uplink control channel in each subframe, thereby improving resource utilization when compared with reserving a fixed uplink control channel resource. For example, if uplink control channel resources are reserved in all subframes based on a maximum quantity of resources that are possibly used, resource utilization is low. If uplink control channel resources are reserved based on a minimum quantity of resources that are possibly used, uplink control channel capacities may be insufficient, and therefore some uplink control information cannot be fed back, unnecessary data retransmission is caused, and resource utilization is reduced.

302. The terminal device determines, based on the first information, the symbol that carries the uplink control information.

In this step, the terminal device determines, based on the first information, the symbol that carries the uplink control information.

Further, optionally, when the downlink control information further includes second information, and the second information is used to indicate the subframe that carries the uplink control information, this step may include:

determining, by the terminal device based on the second information, the subframe that carries the uplink control information; and determining, by the terminal device based on the first information, the symbol that carries the uplink control information and that is in the subframe that carries the uplink control information.

Further, optionally, when the downlink control information further includes third information, and the third information is used to indicate a frequency-domain resource and/or a code resource corresponding to an uplink control channel that carries the uplink control information and that is on the symbol carrying the uplink control information, this step may further include:

determining, by the terminal device based on the third information, the frequency-domain resource and/or the code resource corresponding to the uplink control channel that carries the uplink control information and that is on the symbol, where the symbol carries the uplink control information and is in the subframe carrying the uplink control information.

Further, optionally, when the downlink control information further includes the third information, the third information is used to indicate an uplink control channel index corresponding to an uplink control channel that carries the uplink control information and that is on the symbol carrying the uplink control information, and the uplink control channel index is used by the terminal device to determine, based on the uplink control channel index, a frequency-domain resource and/or a code resource corresponding to the uplink control channel, this step may further include:

determining, by the terminal device based on the third information, the uplink control channel index corresponding to the uplink control channel that carries the uplink control information and that is on the symbol carrying the uplink control information; and determining, by the terminal device based on the uplink control channel index, the frequency-domain resource and/or the code resource corresponding to the uplink control channel.

Further, optionally, that the first information is used to indicate the symbol that carries the uplink control information may be as follows: The first information is used to indicate a start symbol that carries the uplink control information. In this case, the downlink control information may further include fourth information, and the fourth information is used to indicate an end symbol that carries the uplink control information. This step may further include:

determining, by the terminal device based on the first information, the start symbol that carries the uplink control information; and determining, by the terminal device based on the fourth information, the end symbol that carries the uplink control information.

Further, optionally, the first information is corresponding to a 2-bit information field, and that the terminal device determines, based on the first information, the symbol that carries the uplink control information may be:

if the 2-bit information field corresponding to the first information is 00, determining, by the terminal device, that the symbol that carries the uplink control information is a last symbol in the subframe that carries the uplink control information;

if the 2-bit information field corresponding to the first information is 01, determining, by the terminal device, that the symbol that carries the uplink control information is a penultimate symbol, that is, a symbol before a last symbol in the subframe that carries the uplink control information;

if the 2-bit information field corresponding to the first information is 10, determining, by the terminal device, that the symbol that carries the uplink control information is a second symbol in the subframe that carries the uplink control information; or if the 2-bit information field corresponding to the first information is 11, determining, by the terminal device, that the symbol that carries the uplink control information is a third symbol in the subframe that carries the uplink control information.

Alternatively, that the terminal device determines, based on the first information, the symbol that carries the uplink control information may be:

if the 2-bit information field corresponding to the first information is 11, determining, by the terminal device, that the symbol that carries the uplink control information is a last symbol in the subframe that carries the uplink control information;

if the 2-bit information field corresponding to the first information is 10, determining, by the terminal device, that the symbol that carries the uplink control information is a penultimate symbol, that is, a symbol before a last symbol in the subframe that carries the uplink control information;

if the 2-bit information field corresponding to the first information is 00, determining, by the terminal device, that the symbol that carries the uplink control information is a second symbol in the subframe that carries the uplink control information; or if the 2-bit information field corresponding to the first information is 01, determining, by the terminal device, that the symbol that carries the uplink control information is a third symbol in the subframe that carries the uplink control information.

Alternatively, that the terminal device determines, based on the first information, the symbol that carries the uplink control information may be:

if the 2-bit information field corresponding to the first information is 00, determining, by the terminal device, that the symbol that carries the uplink control information is a last symbol in the subframe that carries the uplink control information;

if the 2-bit information field corresponding to the first information is 01, determining, by the terminal device, that the symbol that carries the uplink control information is a penultimate symbol, that is, a symbol before a last symbol in the subframe that carries the uplink control information;

if the 2-bit information field corresponding to the first information is 10, determining, by the terminal device, that the symbol that carries the uplink control information is a second symbol in the subframe that carries the uplink control information; or if the 2-bit information field corresponding to the first information is 11, determining, by the terminal device, that the symbol that carries the uplink control information is all symbols, used for uplink transmission, in the subframe that carries the uplink control information.

Further, optionally, the first information is corresponding to a 3-bit information field, and that the terminal device determines, based on the first information, the symbol that carries the uplink control information may be:

if the 3-bit information field corresponding to the first information is 000, determining, by the terminal device, that the symbol that carries the uplink control information is a first symbol in the subframe that carries the uplink control information;

if the 3-bit information field corresponding to the first information is 001, determining, by the terminal device, that the symbol that carries the uplink control information is a second symbol in the subframe that carries the uplink control information;

if the 3-bit information field corresponding to the first information is 010, determining, by the terminal device, that the symbol that carries the uplink control information is a third symbol in the subframe that carries the uplink control information;

if the 3-bit information field corresponding to the first information is 011, determining, by the terminal device, that the symbol that carries the uplink control information is a fourth symbol in the subframe that carries the uplink control information;

if the 3-bit information field corresponding to the first information is 100, determining, by the terminal device, that the symbol that carries the uplink control information is a fifth symbol in the subframe that carries the uplink control information;

if the 3-bit information field corresponding to the first information is 101, determining, by the terminal device, that the symbol that carries the uplink control information is a sixth symbol in the subframe that carries the uplink control information;

if the 3-bit information field corresponding to the first information is 110, determining, by the terminal device, that the symbol that carries the uplink control information is a seventh symbol in the subframe that carries the uplink control information; or if the 3-bit information field corresponding to the first information is 111, determining, by the terminal device, that the symbol that carries the uplink control information is all symbols, used for uplink transmission, in the subframe that carries the uplink control information, or the field is in a reservation state (that is, meaningless).

In this case, the subframe that carries the uplink control information may include seven symbols.

Further, optionally, that the terminal device determines, based on the first information, the symbol that carries the uplink control information may be:

if the 4-bit information field corresponding to the first information is 0000, determining, by the terminal device, that the symbol that carries the uplink control information is a first symbol in the subframe that carries the uplink control information;

if the 4-bit information field corresponding to the first information is 0001, determining, by the terminal device, that the symbol that carries the uplink control information is a second symbol in the subframe that carries the uplink control information;

if the 4-bit information field corresponding to the first information is 0010, determining, by the terminal device, that the symbol that carries the uplink control information is a third symbol in the subframe that carries the uplink control information;

if the 4-bit information field corresponding to the first information is 0011, determining, by the terminal device, that the symbol that carries the uplink control information is a fourth symbol in the subframe that carries the uplink control information;

if the 4-bit information field corresponding to the first information is 0100, determining, by the terminal device, that the symbol that carries the uplink control information is a fifth symbol in the subframe that carries the uplink control information;

if the 4-bit information field corresponding to the first information is 0101, determining, by the terminal device, that the symbol that carries the uplink control information is a sixth symbol in the subframe that carries the uplink control information;

if the 4-bit information field corresponding to the first information is 0110, determining, by the terminal device, that the symbol that carries the uplink control information is a seventh symbol in the subframe that carries the uplink control information;

if the 4-bit information field corresponding to the first information is 0111, determining, by the terminal device, that the symbol that carries the uplink control information is an eighth symbol in the subframe that carries the uplink control information;

if the 4-bit information field corresponding to the first information is 1000, determining, by the terminal device, that the symbol that carries the uplink control information is a ninth symbol in the subframe that carries the uplink control information;

if the 4-bit information field corresponding to the first information is 1001, determining, by the terminal device, that the symbol that carries the uplink control information is a tenth symbol in the subframe that carries the uplink control information;

if the 4-bit information field corresponding to the first information is 1010, determining, by the terminal device, that the symbol that carries the uplink control information is an eleventh symbol in the subframe that carries the uplink control information;

if the 4-bit information field corresponding to the first information is 1011, determining, by the terminal device, that the symbol that carries the uplink control information is a twelfth symbol in the subframe that carries the uplink control information;

if the 4-bit information field corresponding to the first information is 1100, determining, by the terminal device, that the symbol that carries the uplink control information is a thirteenth symbol in the subframe that carries the uplink control information;

if the 4-bit information field corresponding to the first information is 1101, determining, by the terminal device, that the symbol that carries the uplink control information is a fourteenth symbol in the subframe that carries the uplink control information; or if the 4-bit information field corresponding to the first information is 1110 or 1111, determining, by the terminal device, that the symbol that carries the uplink control information is all symbols, used for uplink transmission, in the subframe that carries the uplink control information, or the field is in a reservation state (that is, meaningless).

In this case, the subframe that carries the uplink control information may include 14 symbols.

Further, optionally, the downlink control information is used to schedule downlink shared channel transmission, and the uplink control information is a hybrid automatic repeat request corresponding to the downlink shared channel transmission.

Further, optionally, the downlink control information is carried in a subframe n, the downlink shared channel transmission is carried in a subframe n+k1, and the uplink control information is carried in a subframe n+k1+k0, where k1 is an integer greater than or equal to 1, and k0 is an integer greater than or equal to 0; a value of k0 may be determined based on the second information; and the downlink control information may include sixth information, and the sixth information is used to indicate a value of k1.

Further, optionally, the subframe that carries the downlink control information is of a fourth subframe type, and the subframe that carries the downlink shared channel transmission is of a third subframe type. A symbol used for downlink transmission in the third subframe type is mainly used for downlink control channel transmission and downlink data transmission, and a symbol used for uplink transmission in the third subframe type is mainly used for uplink control information transmission and/or uplink reference signal transmission, for example, is used for SRS transmission. A symbol used for downlink transmission in the fourth subframe type is mainly used for downlink control channel transmission, and a symbol used for uplink transmission in the fourth subframe type is mainly used for uplink data transmission, uplink control information transmission, and uplink reference signal transmission.

303. The terminal device maps the uplink control information to the symbol that carries the uplink control information, and sends the uplink control information to a network device.

In this step, the terminal device maps the uplink control information to the symbol that carries the uplink control information, and sends the uplink control information to the network device.

It should be noted that, in this embodiment of this application, unless otherwise specified, a sequence between the steps is not limited, and a dependency between the steps is not limited.

Figure 7:
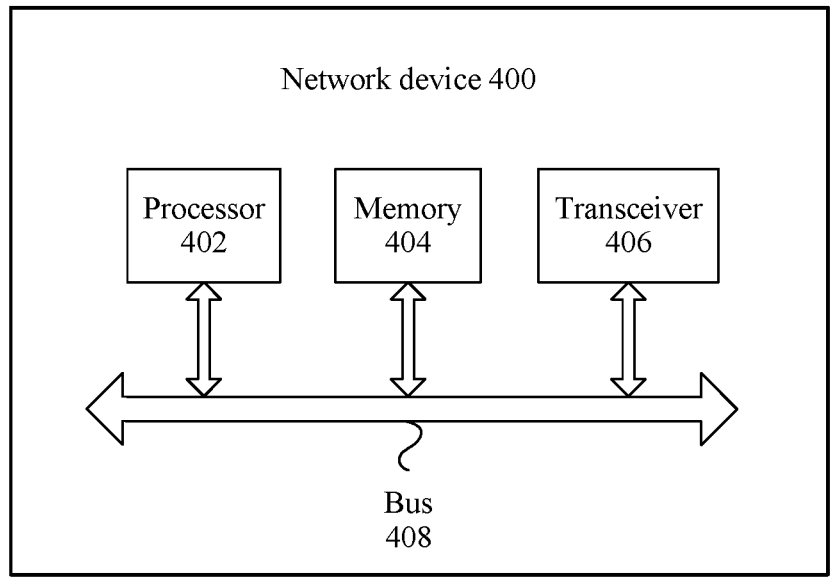
FIG. 7 is a schematic diagram of an organizational structure of a network device according to this application.

The network device in FIG. 1 may be implemented by using a network device 400 in FIG. 7. A schematic diagram of an organizational structure of the network device 400 is shown in FIG. 7. The network device 400 includes a processor 402, a memory 404, and a transceiver 406, and may further include a bus 408.

Communications connections among the processor 402, the memory 404, and the transceiver 406 may be implemented by using the bus 408, or communication among the processor 402, the memory 404, and the transceiver 406 may be implemented by using other means such as wireless transmission.

The memory 404 may include a volatile memory, for example, a random access memory (RAM). The memory may also include a non-volatile memory, for example, a read-only memory (ROM), a flash memory, a hard disk (HDD), or a solid-state drive (SSD). Alternatively, the memory 404 may include a combination of the foregoing types of memories. When technical solutions provided in this application are implemented by using software, program code that is used to implement an information transmission method provided in FIG. 8 in this application is stored in the memory 404, and is executed by the processor 402.

The network device 400 communicates with a terminal device by using the transceiver 406.

The processor 402 may be a CPU.

In this embodiment of this application, downlink control information includes first information, and the first information is used to indicate a symbol the carries uplink control information; and the processor 402 sends the downlink control information by using the transceiver 406, and receives, by using the transceiver 406 on the symbol that carries the uplink control information, the uplink control information sent by the terminal device. Therefore, receiving, on the symbol that carries the uplink control information, the uplink control information sent by the terminal device enables fast hybrid automatic repeat request feedback and fast retransmission, thereby reducing a latency; and enables use of a same solution for the FDD system and the TDD system, and enables use of a same HARQ timing transmission interval. This can not only flexibly deal with a problem that uplink control information in different subframes requires different resources because of flexible HARQ timing, but also enable a flexible change of a resource used for transmitting an uplink control channel in each subframe, thereby improving resource utilization when compared with reserving a fixed uplink control channel resource.

Optionally, the downlink control information further includes second information, the second information is used to indicate a subframe that carries the uplink control information, and the symbol that carries the uplink control information is a symbol in the subframe that carries the uplink control information.

Optionally, the downlink control information further includes third information, and the third information is used to indicate a frequency-domain resource and/or a code resource corresponding to an uplink control channel that carries the uplink control information and that is on the symbol carrying the uplink control information.

Optionally, the symbol that carries the uplink control information is a start symbol that carries the uplink control information.

Optionally, the downlink control information further includes fourth information, and the fourth information is used to indicate an end symbol that carries the uplink control information.

Optionally, the first information is corresponding to a 2-bit information field; and the symbol that carries the uplink control information is as follows:

if the 2-bit information field corresponding to the first information is 00, the symbol that carries the uplink control information is a last symbol in the subframe that carries the uplink control information;

if the 2-bit information field corresponding to the first information is 01, the symbol that carries the uplink control information is a symbol before a last symbol in the subframe that carries the uplink control information;

if the 2-bit information field corresponding to the first information is 10, the symbol that carries the uplink control information is a second symbol in the subframe that carries the uplink control information; or if the 2-bit information field corresponding to the first information is 11, the symbol that carries the uplink control information is a third symbol in the subframe that carries the uplink control information.

Optionally, the first information is corresponding to a 3-bit information field, and the subframe that carries the uplink control information includes seven symbols; or the first information is corresponding to a 4-bit information field, and the subframe that carries the uplink control information includes 14 symbols.

Optionally, the downlink control information is used to schedule downlink shared channel transmission, and the uplink control information is a hybrid automatic repeat request corresponding to the downlink shared channel transmission.

Optionally, a subframe that carries the downlink control information is of a fourth subframe type, a subframe that carries the downlink shared channel transmission is of a third subframe type, and both the third subframe type and the fourth subframe type include a symbol used for downlink transmission, a guard period, and a symbol used for uplink transmission.

Optionally, the downlink control information is carried in a subframe n, the downlink shared channel transmission is carried in a subframe n+k1, the uplink control information is carried in a subframe n+k1+k0, k1 is an integer greater than or equal to 1, and k0 is an integer greater than or equal to 0.

Optionally, the downlink control information includes fifth information, the fifth information is used to trigger reporting of channel state information, and the uplink control information is the channel state information.

Figure 8:
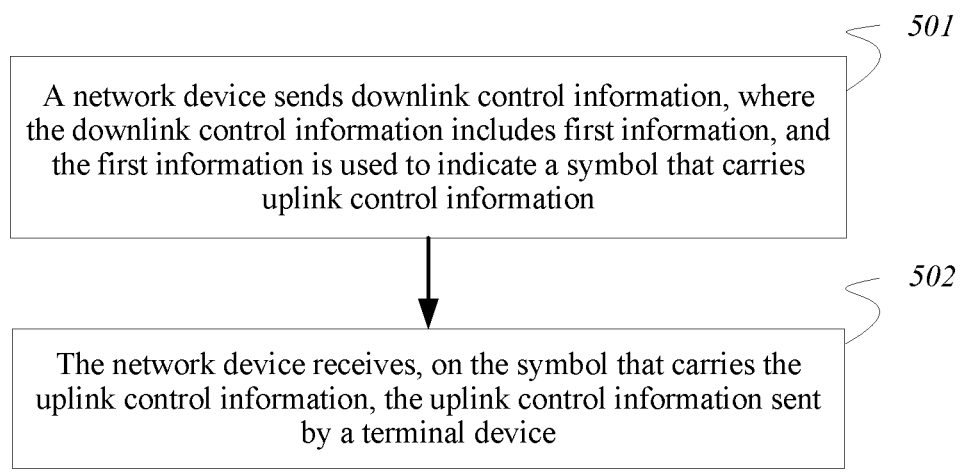
FIG. 8 is another schematic flowchart of an information transmission method according to this application.

This application further provides an information transmission method. The network devices in FIG. 1 and in FIG. 7 perform the method during running, and a schematic flowchart of the method is shown in FIG. 8.

501. A network device sends downlink control information, where the downlink control information includes first information, and the first information is used to indicate a symbol that carries uplink control information.

In this step, that a network device sends downlink control information, where the downlink control information includes first information, and the first information is used to indicate a symbol that carries uplink control information may be:

sending, by the network device, a downlink control channel, where downlink control information carried in the downlink control channel includes the first information, and the first information is used to indicate the symbol that carries the uplink control information.

Alternatively, that a network device sends downlink control information, where the downlink control information includes first information, and the first information is used to indicate a symbol that carries uplink control information may be:

sending, by the network device, a downlink control channel, where a downlink control information format corresponding to the downlink control channel includes a first information field, and the first information field is used to indicate the symbol that carries the uplink control information.

Alternatively, that a network device sends downlink control information, where the downlink control information includes first information, and the first information is used to indicate a symbol that carries uplink control information may be:

sending, by the network device, a downlink control information format, where the downlink control information format includes a first information field, and the first information field is used to indicate the symbol that carries the uplink control information.

Other descriptions of this step are the same of those of step 301 in this embodiment, and details are not described herein again.

Further, optionally, step 501, that is, a network device sends downlink control information, where the downlink control information includes first information, and the first information is used to indicate a symbol that carries uplink control information, may include the following steps.

501-*a*. The network device determines the symbol that carries the uplink control information.

In step 501-*a*, the network device may determine, based on an actual scenario, the symbol that carries the uplink control information. For example, in a scenario shown in FIG. 4, if fast retransmission needs to be enabled, the network device determines that the symbol that carries the uplink control information is a penultimate symbol of a subframe n. In a scenario shown in FIG. 5, if fast HARQ-ACK feedback in an FDD system needs to be enabled, the network device may determine that the symbol that carries the uplink control information is a second symbol in a subframe n+1. In a scenario shown in FIG. 6, if the network device may determine that a symbol that carries uplink control information corresponding to a subframe n is a penultimate symbol in a subframe n+2, a symbol that carries uplink control information corresponding to a subframe n+1 is a last symbol in the subframe n+2.

501-*b*: The network device determines the first information in the downlink control information based on the symbol that carries the uplink control information.

Further, optionally, in step 501-*b*, that the network device determines the first information in the downlink control information based on the symbol that carries the uplink control information and that the first information is corresponding to a 2-bit information field may include:

if the symbol that carries the uplink control information is a last symbol in a subframe that carries the uplink control information, determining, by the network device, that the 2-bit information field corresponding to the first information is 00;

if the symbol that carries the uplink control information is a penultimate symbol in a subframe that carries the uplink control information, determining, by the network device, that the 2-bit information field corresponding to the first information is 01;

if the symbol that carries the uplink control information is a second symbol in a subframe that carries the uplink control information, determining, by the network device, that the 2-bit information field corresponding to the first information is 10; or if the symbol that carries the uplink control information is a third symbol in a subframe that carries the uplink control information, determining, by the network device, that the 2-bit information field corresponding to the first information is 11; or if the symbol that carries the uplink control information is a last symbol in a subframe that carries the uplink control information, determining, by the network device, that the 2-bit information field corresponding to the first information is 11;

if the symbol that carries the uplink control information is a penultimate symbol in a subframe that carries the uplink control information, determining, by the network device, that the 2-bit information field corresponding to the first information is 10;

if the symbol that carries the uplink control information is a second symbol in a subframe that carries the uplink control information, determining, by the network device, that the 2-bit information field corresponding to the first information is 00; or if the symbol that carries the uplink control information is a third symbol in a subframe that carries the uplink control information, determining, by the network device, that the 2-bit information field corresponding to the first information is 01; or if the symbol that carries the uplink control information is a last symbol in a subframe that carries the uplink control information, determining, by the network device, that the 2-bit information field corresponding to the first information is 00;

if the symbol that carries the uplink control information is a penultimate symbol in a subframe that carries the uplink control information, determining, by the network device, that the 2-bit information field corresponding to the first information is 01;

if the symbol that carries the uplink control information is a second symbol in a subframe that carries the uplink control information, determining, by the network device, that the 2-bit information field corresponding to the first information is 10; or if the symbol that carries the uplink control information is all symbols in a subframe that carries the uplink control information, determining, by the network device, that the 2-bit information field corresponding to the first information is 11.

Further, optionally, in step 501-*b*, that the network device determines the first information in the downlink control information based on the symbol that carries the uplink control information and that the first information is corresponding to a 3-bit information field may include:

if the symbol that carries the uplink control information is a first symbol in a subframe that carries the uplink control information, determining, by the network device, that the 3-bit information field corresponding to the first information is 000;

if the symbol that carries the uplink control information is a second symbol in a subframe that carries the uplink control information, determining, by the network device, that the 3-bit information field corresponding to the first information is 001;

if the symbol that carries the uplink control information is a third symbol in a subframe that carries the uplink control information, determining, by the network device, that the 3-bit information field corresponding to the first information is 010;

if the symbol that carries the uplink control information is a fourth symbol in a subframe that carries the uplink control information, determining, by the network device, that the 3-bit information field corresponding to the first information is 011;

if the symbol that carries the uplink control information is a fifth symbol in a subframe that carries the uplink control information, determining, by the network device, that the 3-bit information field corresponding to the first information is 100;

if the symbol that carries the uplink control information is a sixth symbol in a subframe that carries the uplink control information, determining, by the network device, that the 3-bit information field corresponding to the first information is 101; or if the symbol that carries the uplink control information is a seventh symbol in a subframe that carries the uplink control information, determining, by the network device, that the 3-bit information field corresponding to the first information is 110.

In this case, the subframe that carries the uplink control information may include seven symbols.

Further, optionally, in step 501-*b*, that the network device determines the first information in the downlink control information based on the symbol that carries the uplink control information and that the first information is corresponding to a 4-bit information field may include:

if the symbol that carries the uplink control information is a first symbol in a subframe that carries the uplink control information, determining, by the network device, that the 4-bit information field corresponding to the first information is 0000;

if the symbol that carries the uplink control information is a second symbol in a subframe that carries the uplink control information, determining, by the network device, that the 4-bit information field corresponding to the first information is 0001;

if the symbol that carries the uplink control information is a third symbol in a subframe that carries the uplink control information, determining, by the network device, that the 4-bit information field corresponding to the first information is 0010;

if the symbol that carries the uplink control information is a fourth symbol in a subframe that carries the uplink control information, determining, by the network device, that the 4-bit information field corresponding to the first information is 0011;

if the symbol that carries the uplink control information is a fifth symbol in a subframe that carries the uplink control information, determining, by the network device, that the 4-bit information field corresponding to the first information is 0100;

if the symbol that carries the uplink control information is a sixth symbol in a subframe that carries the uplink control information, determining, by the network device, that the 4-bit information field corresponding to the first information is 0101;

if the symbol that carries the uplink control information is a seventh symbol in a subframe that carries the uplink control information, determining, by the network device, that the 4-bit information field corresponding to the first information is 0110;

if the symbol that carries the uplink control information is an eighth symbol in a subframe that carries the uplink control information, determining, by the network device, that the 4-bit information field corresponding to the first information is 0111;

if the symbol that carries the uplink control information is a ninth symbol in a subframe that carries the uplink control information, determining, by the network device, that the 4-bit information field corresponding to the first information is 1000;

if the symbol that carries the uplink control information is a tenth symbol in a subframe that carries the uplink control information, determining, by the network device, that the 4-bit information field corresponding to the first information is 1001;

if the symbol that carries the uplink control information is an eleventh symbol in a subframe that carries the uplink control information, determining, by the network device, that the 4-bit information field corresponding to the first information is 1010;

if the symbol that carries the uplink control information is a twelfth symbol in a subframe that carries the uplink control information, determining, by the network device, that the 4-bit information field corresponding to the first information is 1011;

if the symbol that carries the uplink control information is a thirteenth symbol in a subframe that carries the uplink control information, determining, by the network device, that the 4-bit information field corresponding to the first information is 1100; or if the symbol that carries the uplink control information is a fourteenth symbol in a subframe that carries the uplink control information, determining, by the network device, that the 4-bit information field corresponding to the first information is 1101.

In this case, the subframe that carries the uplink control information may include 14 symbols.

501-c: The network device sends the downlink control information, where the first information in the downlink control information is used to indicate the symbol that carries the uplink control information.

502. The network device receives, on the symbol that carries the uplink control information, the uplink control information sent by a terminal device.

In this step, the network device receives, on the symbol that carries the uplink control information, the uplink control information sent by the terminal device.

Further, optionally, when the downlink control information further includes second information, and the second information is used to indicate the subframe that carries the uplink control information, step 502 may include:

receiving, by the network device on the symbol that carries the uplink control information and that is in the subframe carrying the uplink control information, the uplink control information sent by the terminal device.

Further, optionally, when the downlink control information further includes third information, and the third information is used to indicate a frequency-domain resource and/or a code resource corresponding to an uplink control channel that carries the uplink control information and that is on the symbol carrying the uplink control information, step 502 may further include:

receiving, by the network device on the symbol that carries the uplink control information and that is in the subframe carrying the uplink control information and on the frequency-domain resource corresponding to the uplink control channel that carries the uplink control information, the uplink control information sent by the terminal device.

It should be noted that, in this embodiment of this application, unless otherwise specified, a sequence between the steps is not limited, and a dependency between the steps is not limited.

An embodiment of this application further provides an information transmission apparatus 600, and the apparatus 600 may be implemented by using the terminal device 200 shown in FIG. 2, or may be implemented by using an application-specific integrated circuit (ASIC) or a programmable logic device (PLD). The PLD may be a complex programmable logic device (CPLD), an FPGA, generic array logic (GAL), or any combination thereof. The information transmission apparatus 600 is configured to implement the information transmission method shown in FIG. 3. When implementing the information transmission method shown in FIG. 3 by using software, the apparatus 600 may also be a software module.

Figure 9:
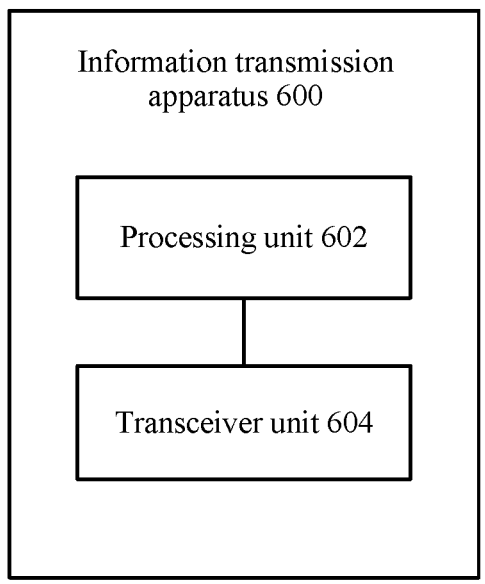
FIG. 9 is a schematic diagram of an organizational structure of an information transmission apparatus according to this application.

A schematic diagram of an organizational structure of the information transmission apparatus 600 is shown in FIG. 9. The information transmission apparatus 600 includes a processing unit 602 and a transceiver unit 604. During working, the processing unit 602 performs step 302 and step 303 and the optional solutions of step 302 and step 303 in the information transmission method shown in FIG. 3. During working, the transceiver unit 604 performs step 301 and the optional solution of step 301 in the information transmission method shown in FIG. 3. It should be noted that in this embodiment of this application, the processing unit 602 may also be implemented by the processor 202 shown in FIG. 2, and the transceiver unit 604 may also be implemented by the transceiver 202 shown in FIG. 2.

After receiving the downlink control information, the information transmission apparatus 600 determines, based on first information, a symbol that carries uplink control information, maps the uplink control information to the symbol that carries the uplink control information, and sends the uplink control information to a network device. Therefore, mapping the uplink control information to the symbol that carries the uplink control information enables fast hybrid automatic repeat request feedback and fast retransmission, thereby reducing a latency; and enables use of a same solution for an FDD system and a TDD system, and enables use of a same HARQ timing transmission interval. This can not only flexibly deal with a problem that uplink control information in different subframes requires different resources because of flexible HARQ timing, but also enable a flexible change of a resource used for transmitting an uplink control channel in each subframe, thereby improving resource utilization when compared with reserving a fixed uplink control channel resource.

An embodiment of this application further provides an information transmission apparatus 700. The apparatus 700 may be implemented by using the network device 400 shown in FIG. 7, or may be implemented by using an ASIC, or a PLD. The PLD may be a complex programmable logic device CPLD, an FPGA, a GAL, or any combination thereof. The information transmission apparatus 700 is configured to implement the information transmission method shown in FIG. 8. When implementing the information transmission method shown in FIG. 8 by using software, the apparatus 700 may also be a software module.

Figure 10:
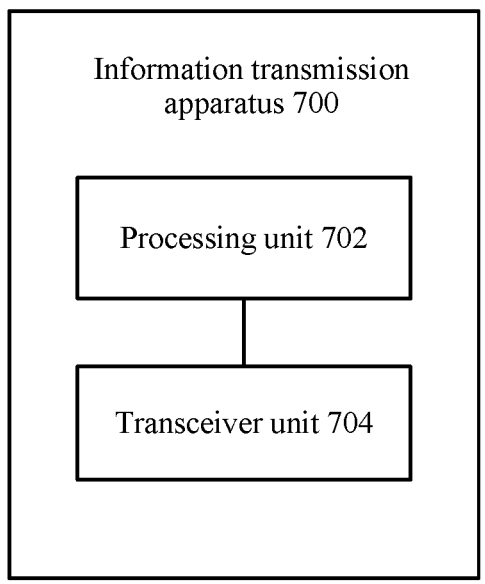
FIG. 10 is another schematic diagram of an organizational structure of an information transmission apparatus according to this application.

A schematic diagram of an organizational structure of the information transmission apparatus 700 is shown in FIG. 10. The information transmission apparatus 700 includes a processing unit 702 and a transceiver unit 704. During working, the processing unit 702 performs step 501 and the optional solution of step 501 in the information transmission method shown in FIG. 8. During working, the transceiver unit 704 performs step 502 and the optional solution of step 502 in the information transmission method shown in FIG. 8. It should be noted that in this embodiment of this application, the processing unit 702 may also be implemented by the processor 402 shown in FIG. 7, and the transceiver unit 704 may also be implemented by the transceiver 402 shown in FIG. 7.

The information transmission apparatus 700 sends the downlink control information, and receives, on a symbol that carries the uplink control information, the uplink control information sent by a terminal device. Therefore, receiving, on the symbol that carries the uplink control information, the uplink control information sent by the terminal device enables fast hybrid automatic repeat request feedback and fast retransmission, thereby reducing a latency; and enables use of a same solution for the FDD system and the TDD system, and enables use of a same HARQ timing transmission interval. This can not only flexibly deal with a problem that uplink control information in different subframes requires different resources because of flexible HARQ timing, but also enable a flexible change of a resource used for transmitting an uplink control channel in each subframe, thereby improving resource utilization when compared with reserving a fixed uplink control channel resource.

It may be clearly understood by persons skilled in the art that, for the purpose of convenient and brief description, for a detailed working process of the foregoing apparatus and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, functions described in this application may be implemented by hardware or software. When the present disclosure is implemented by software, the foregoing functions may be stored in a computer-readable medium or transmitted as one or more instructions or code in the computer-readable medium. The storage medium may be any available medium accessible to a general-purpose or dedicated computer.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An information transmission method, comprising:
   receiving, by a terminal device, downlink control information, wherein the downlink control information indicates a subframe that carries uplink control information and indicates a symbol that is of the subframe and carries the uplink control information, wherein the downlink control information further indicates a frequency-domain resource and a code resource corresponding to an uplink control channel that carries the uplink control information, wherein the downlink control information is used to schedule downlink shared channel transmission, wherein the uplink control information comprises a hybrid automatic repeat request corresponding to the downlink shared channel transmission, wherein the symbol that carries the uplink control information is indicated by a first information in the downlink control information, the first information corresponds to a 3-bit information field, and wherein:
 if the 3-bit information field corresponding to the first information is 000, the symbol that carries the uplink control information is a first symbol in the subframe that carries the uplink control information;
 if the 3-bit information field corresponding to the first information is 001, the symbol that carries the uplink control information is a second symbol in the subframe that carries the uplink control information;
 if the 3-bit information field corresponding to the first information is 010, the symbol that carries the uplink control information is a third symbol in the subframe that carries the uplink control information;
 if the 3-bit information field corresponding to the first information is 011, the symbol that carries the uplink control information is a fourth symbol in the subframe that carries the uplink control information;
 if the 3-bit information field corresponding to the first information is 100, the symbol that carries the uplink control information is a fifth symbol in the subframe that carries the uplink control information;
 if the 3-bit information field corresponding to the first information is 101, the symbol that carries the uplink control information is a sixth symbol in the subframe that carries the uplink control information;
 if the 3-bit information field corresponding to the first information is 110, the symbol that carries the uplink control information is a seventh symbol in the subframe that carries the uplink control information; or
 if the 3-bit information field corresponding to the first information is 111, the symbol that carries the uplink control information is all symbols, used for uplink transmission, in the subframe that carries the uplink control information;
determining, by the terminal device based on the downlink control information, the symbol that carries the uplink control information and that is in the subframe carrying the uplink control information;
mapping, by the terminal device, the uplink control information to the symbol that carries the uplink control information and that is in the subframe carrying the uplink control information; and
sending, by the terminal device, the uplink control information to a network device.

2. An information transmission method, comprising:
sending, by a network device, downlink control information, wherein the downlink control information indicates a subframe that carries uplink control information and indicates a symbol that is of the subframe and carries uplink control information, wherein the downlink control information further indicates a frequency-domain resource and a code resource corresponding to an uplink control channel that carries the uplink control information, wherein the downlink control information is used to schedule downlink shared channel transmission, wherein the uplink control information comprises a hybrid automatic repeat request corresponding to the downlink shared channel transmission, wherein the symbol that carries the uplink control information is indicated by a first information in the downlink control information, the first information corresponds to a 3-bit information field, and wherein:
 if the 3-bit information field corresponding to the first information is 000, the symbol that carries the uplink control information is a first symbol in the subframe that carries the uplink control information;
 if the 3-bit information field corresponding to the first information is 001, the symbol that carries the uplink control information is a second symbol in the subframe that carries the uplink control information;
 if the 3-bit information field corresponding to the first information is 010, the symbol that carries the uplink control information is a third symbol in the subframe that carries the uplink control information;
 if the 3-bit information field corresponding to the first information is 011, the symbol that carries the uplink control information is a fourth symbol in the subframe that carries the uplink control information;
 if the 3-bit information field corresponding to the first information is 100, the symbol that carries the uplink control information is a fifth symbol in the subframe that carries the uplink control information;
 if the 3-bit information field corresponding to the first information is 101, the symbol that carries the uplink control information is a sixth symbol in the subframe that carries the uplink control information;
 if the 3-bit information field corresponding to the first information is 110, the symbol that carries the uplink control information is a seventh symbol in the subframe that carries the uplink control information; or
 if the 3-bit information field corresponding to the first information is 111, the symbol that carries the uplink control information is all symbols, used for uplink transmission, in the subframe that carries the uplink control information; and
receiving, by the network device on the symbol that carries the uplink control information and the subframe that carries the uplink control information, the uplink control information sent by a terminal device, wherein the symbol is determined by the terminal device based on the downlink control information.

3. An information transmission apparatus, comprising:
one or more processors;
a non-transitory memory for storing computer instructions that, when executed by the one or more processors, cause the apparatus to perform the steps of:
 receiving downlink control information, wherein the downlink control information indicates a subframe that carries uplink control information and indicates a symbol that is of the subframe and carries the uplink control information, wherein the downlink control information further indicates a frequency-domain resource and a code resource corresponding to an uplink control channel that carries the uplink control information, wherein the downlink control information is used to schedule downlink shared channel transmission, wherein the uplink control information comprises a hybrid automatic repeat request corresponding to the downlink shared channel transmission, wherein the symbol that carries the uplink control information is indicated by a first information in the downlink control information, the first information corresponds to a 3-bit information field, and wherein:
  if the 3-bit information field corresponding to the first information is 000, the symbol that carries the uplink control information is a first symbol in the subframe that carries the uplink control information;

if the 3-bit information field corresponding to the first information is 001, the symbol that carries the uplink control information is a second symbol in the subframe that carries the uplink control information;

if the 3-bit information field corresponding to the first information is 010, the symbol that carries the uplink control information is a third symbol in the subframe that carries the uplink control information;

if the 3-bit information field corresponding to the first information is 011, the symbol that carries the uplink control information is a fourth symbol in the subframe that carries the uplink control information;

if the 3-bit information field corresponding to the first information is 100, the symbol that carries the uplink control information is a fifth symbol in the subframe that carries the uplink control information;

if the 3-bit information field corresponding to the first information is 101, the symbol that carries the uplink control information is a sixth symbol in the subframe that carries the uplink control information;

if the 3-bit information field corresponding to the first information is 110, the symbol that carries the uplink control information is a seventh symbol in the subframe that carries the uplink control information; or if the 3-bit information field corresponding to the first information is 111, the symbol that carries the uplink control information is all symbols, used for uplink transmission, in the subframe that carries the uplink control information;

determining, based on the downlink control information, the symbol that carries the uplink control information and that is in the subframe carrying the uplink control information;

mapping the uplink control information to the symbol that carries the uplink control information and that is in the subframe carrying the uplink control information; and sending the uplink control information to a network device.

4. An information transmission apparatus, comprising:
one or more processors;
a non-transitory memory for storing computer instructions that when executed by the one or more processors cause the apparatus to perform the steps of:
sending downlink control information, wherein the downlink control information indicates a subframe that carries uplink control information and indicates a symbol that is of the subframe and carries the uplink control information, wherein the uplink control information comprises the channel state information, wherein the downlink control information is used to schedule downlink shared channel transmission, wherein the uplink control information comprises a hybrid automatic repeat request corresponding to the downlink shared channel transmission, wherein the symbol that carries the uplink control information is indicated by a first information in the downlink control information, the first information corresponds to a 3-bit information field, and wherein:

if the 3-bit information field corresponding to the first information is 000, the symbol that carries the uplink control information is a first symbol in the subframe that carries the uplink control information;

if the 3-bit information field corresponding to the first information is 001, the symbol that carries the uplink control information is a second symbol in the subframe that carries the uplink control information;

if the 3-bit information field corresponding to the first information is 010, the symbol that carries the uplink control information is a third symbol in the subframe that carries the uplink control information;

if the 3-bit information field corresponding to the first information is 011, the symbol that carries the uplink control information is a fourth symbol in the subframe that carries the uplink control information;

if the 3-bit information field corresponding to the first information is 100, the symbol that carries the uplink control information is a fifth symbol in the subframe that carries the uplink control information;

if the 3-bit information field corresponding to the first information is 101, the symbol that carries the uplink control information is a sixth symbol in the subframe that carries the uplink control information;

if the 3-bit information field corresponding to the first information is 110, the symbol that carries the uplink control information is a seventh symbol in the subframe that carries the uplink control information; or if the 3-bit information field corresponding to the first information is 111, the symbol that carries the uplink control information is all symbols, used for uplink transmission, in the subframe that carries the uplink control information; and receiving, on the symbol that carries the uplink control information and the subframe that carries the uplink control information, the uplink control information sent by a terminal device, wherein the symbol is determined by the terminal device based on the downlink control information.

5. The method according to claim 1, wherein the symbol that carries the uplink control information is indicated by a first information in the downlink control information, and the first information is corresponding to a 2-bit information field, and if the 2-bit information field corresponding to the first information is 00, the symbol that carries the uplink control information is a last symbol in the subframe that carries the uplink control information;

if the 2-bit information field corresponding to the first information is 01, the symbol that carries the uplink control information is a penultimate symbol in the subframe that carries the uplink control information;

if the 2-bit information field corresponding to the first information is 10, the symbol that carries the uplink control information is a second symbol in the subframe that carries the uplink control information; or if the 2-bit information field corresponding to the first information is 11, the symbol that carries the uplink control information is a third symbol in the subframe that carries the uplink control information.

6. The method according to claim 2, wherein the symbol that carries the uplink control information is indicated by a first information in the downlink control information, and the first information is corresponding to a 2-bit information field, and if the 2-bit information field corresponding to the first information is 00, the symbol that carries the uplink control information is a last symbol in the subframe that carries the uplink control information;
   if the 2-bit information field corresponding to the first information is 01, the symbol that carries the uplink control information is a penultimate symbol in the subframe that carries the uplink control information;
   if the 2-bit information field corresponding to the first information is 10, the symbol that carries the uplink control information is a second symbol in the subframe that carries the uplink control information; or
   if the 2-bit information field corresponding to the first information is 11, the symbol that carries the uplink control information is a third symbol in the subframe that carries the uplink control information.

7. The apparatus according to claim 3, wherein the symbol that carries the uplink control information is indicated by a first information in the downlink control information, and the first information is corresponding to a 2-bit information field, and if the 2-bit information field corresponding to the first information is 00, the symbol that carries the uplink control information is a last symbol in the subframe that carries the uplink control information;
   if the 2-bit information field corresponding to the first information is 01, the symbol that carries the uplink control information is a penultimate symbol in the subframe that carries the uplink control information;
   if the 2-bit information field corresponding to the first information is 10, the symbol that carries the uplink control information is a second symbol in the subframe that carries the uplink control information; or
   if the 2-bit information field corresponding to the first information is 11, the symbol that carries the uplink control information is a third symbol in the subframe that carries the uplink control information.

8. The apparatus according to claim 4, wherein the symbol that carries the uplink control information is indicated by a first information in the downlink control information, and the first information is corresponding to a 2-bit information field, and if the 2-bit information field corresponding to the first information is 00, the symbol that carries the uplink control information is a last symbol in the subframe that carries the uplink control information;
   if the 2-bit information field corresponding to the first information is 01, the symbol that carries the uplink control information is a penultimate symbol in the subframe that carries the uplink control information;
   if the 2-bit information field corresponding to the first information is 10, the symbol that carries the uplink control information is a second symbol in the subframe that carries the uplink control information; or
   if the 2-bit information field corresponding to the first information is 11, the symbol that carries the uplink control information is a third symbol in the subframe that carries the uplink control information.

* * * * *